United States Patent
Chandrashekar et al.

(12) 
(10) Patent No.: US 12,185,219 B2
(45) Date of Patent: Dec. 31, 2024

(54) NG BASED CONTEXT RELEASE AND DATA FORWARDING FOR MULTI-HOP MOBILITY

(71) Applicant: Nokia Technologies Oy, Espoo (FI)

(72) Inventors: Subramanya Chandrashekar, Bangalore (IN); Daniela Laselva, Klarup (DK); Ahlem Khlass, Nozay (FR); Philippe Godin, Versailles (FR)

(73) Assignee: NOKIA TECHNOLOGIES OY, Espoo (FI)

( * ) Notice: Subject to any disclaimer, the term of this patent is extended or adjusted under 35 U.S.C. 154(b) by 687 days.

(21) Appl. No.: 17/470,305

(22) Filed: Sep. 9, 2021

(65) Prior Publication Data

US 2022/0086732 A1 Mar. 17, 2022

(30) Foreign Application Priority Data

Sep. 15, 2020 (IN) .............................. 202041039954

(51) Int. Cl.
*H04W 40/24* (2009.01)
*H04W 36/00* (2009.01)
(Continued)

(52) U.S. Cl.
CPC ..... *H04W 40/248* (2013.01); *H04W 36/0055* (2013.01); *H04W 36/0235* (2023.05); *H04W 72/27* (2023.01); *H04W 76/32* (2018.02)

(58) Field of Classification Search
CPC .... H04W 40/248; H04W 76/32; H04W 72/27
See application file for complete search history.

(56) References Cited

U.S. PATENT DOCUMENTS 10,440,630 B2 * 10/2019 Aminaka ............... H04W 72/04
11,153,272 B2 * 10/2021 Yang .................... H04L 61/2592
(Continued)

FOREIGN PATENT DOCUMENTS

| WO | 2019/063086 A1 | 4/2019 |
| WO | 2019/093850 A1 | 5/2019 |
| WO | 2020/067944 A1 | 4/2020 |

OTHER PUBLICATIONS

Extended European Search Report received for corresponding European Patent Application No. 21194705.6, dated Feb. 9, 2022, 12 pages.
(Continued)

*Primary Examiner* — Dominic E Rego
(74) *Attorney, Agent, or Firm* — Lippes Mathias LLP

(57) ABSTRACT

A method, apparatus, and a computer-readable storage medium are provided for NG based context release and data forwarding for multi-hop mobility. In an example implementation, the method may include a core network entity receiving a first message from a first network node, the first message including at least one of a user equipment context release request and a data forwarding request and detecting the at least one of the user equipment context release request and the data forwarding request from the first message. The method may further include sending a second message including at least one of a user equipment context release command and data forwarding information to a second network node based at least on the detected at least one of the user equipment context release request and the data forwarding request.

14 Claims, 11 Drawing Sheets

Example Wireless Network 130

(51) Int. Cl.
*H04W 36/02* (2009.01)
*H04W 72/27* (2023.01)
*H04W 76/32* (2018.01)

(56) References Cited

U.S. PATENT DOCUMENTS

| | | | | |
|---|---|---|---|---|
| 2014/0003357 | A1* | 1/2014 | Ejzak | H04W 76/11 |
| | | | | 370/329 |
| 2015/0173121 | A1* | 6/2015 | Miklos | H04W 68/00 |
| | | | | 370/329 |
| 2017/0164265 | A1* | 6/2017 | Dai | H04W 72/23 |
| 2017/0230104 | A1* | 8/2017 | Purkayastha | H04B 7/18541 |
| 2018/0014237 | A1* | 1/2018 | Xu | H04W 36/302 |
| 2018/0270713 | A1* | 9/2018 | Park | H04L 5/0053 |
| 2018/0270791 | A1* | 9/2018 | Park | H04W 68/025 |
| 2018/0270894 | A1* | 9/2018 | Park | H04W 76/27 |
| 2018/0270895 | A1* | 9/2018 | Park | H04W 68/00 |
| 2018/0279193 | A1* | 9/2018 | Park | H04W 36/24 |
| 2018/0368042 | A1* | 12/2018 | Jin | H04W 36/12 |
| 2019/0045341 | A1* | 2/2019 | Huang | H04L 41/0803 |
| 2019/0045575 | A1* | 2/2019 | Huang | H04W 76/10 |
| 2019/0053193 | A1* | 2/2019 | Park | H04W 72/51 |
| 2019/0141753 | A1* | 5/2019 | Lin | H04W 74/0833 |
| 2019/0182800 | A1* | 6/2019 | Park | H04W 76/27 |
| 2019/0200410 | A1* | 6/2019 | Höglund | H04W 76/27 |
| 2020/0008137 | A1* | 1/2020 | Li | H04W 48/20 |
| 2020/0022046 | A1* | 1/2020 | Wang | H04W 76/27 |
| 2020/0029389 | A1* | 1/2020 | Yilmaz | H04W 8/08 |
| 2020/0037285 | A1* | 1/2020 | Sivavakeesar | H04W 76/27 |
| 2020/0146079 | A1* | 5/2020 | Yang | H04W 76/11 |
| 2020/0154333 | A1* | 5/2020 | Paladugu | H04B 7/18506 |
| 2020/0163004 | A1* | 5/2020 | Demianchik | H04W 40/02 |
| 2020/0275515 | A1* | 8/2020 | Li | H04W 76/34 |
| 2021/0100061 | A1* | 4/2021 | Park | H04W 76/27 |
| 2021/0144675 | A1* | 5/2021 | Zhang | H04W 76/32 |
| 2021/0289579 | A1* | 9/2021 | Ke | H04W 36/08 |
| 2021/0337447 | A1* | 10/2021 | Yang | H04W 36/385 |
| 2021/0377838 | A1* | 12/2021 | Ali | H04W 76/12 |
| 2021/0385704 | A1* | 12/2021 | Mayer | H04W 76/30 |
| 2022/0248493 | A1* | 8/2022 | Kim | H04W 76/30 |
| 2022/0353750 | A1* | 11/2022 | Xu | H04W 36/32 |
| 2023/0120096 | A1* | 4/2023 | Kim | H04W 76/27 |
| | | | | 370/329 |

OTHER PUBLICATIONS

"3rd Generation Partnership Project; Technical Specification Group Radio Access Network; NG-RAN; NG Application Protocol (NGAP) (Release 16)", 3GPP TS 38.413, V16.1.0, Mar. 2020, pp. 1-341.

"3rd Generation Partnership Project; Technical Specification Group Radio Access Network; NR; NR and NG-RAN Overall Description; Stage 2 (Release 16)", 3GPP TS 38.300, V16.1.0, Mar. 2020, pp. 1-133.

"3rd Generation Partnership Project; Technical Specification Group Radio Access Network; NR; User Equipment (UE) procedures in Idle mode and RRC Inactive state (Release 16)", 3GPP TS 38.304, V16.0.0, Mar. 2020, pp. 1-38.

"3rd Generation Partnership Project; Technical Specification Group Radio Access Network; NR; Radio Resource Control (RRC) protocol specification (Release 16)", 3GPP TS 38.331, V16.0.0, Mar. 2020, pp. 1-835.

"3rd Generation Partnership Project; Technical Specification Group Radio Access Network; NG-RAN; Xn application protocol (XnAP) (Release 16)", 3GPP TS 38.423, V16.1.0, Mar. 2020, pp. 1-334.

"3rd Generation Partnership Project; Technical Specification Group Radio Access Network; Study on New Radio Access Technology; Radio Interface Protocol Aspects (Release 14)", 3GPP TR 38.804, V14.0.0, Mar. 2017, pp. 1-57.

"Work Item on NR smalldata transmissions in INACTIVE state", 3GPP TSG RAN Meeting #86, RP-193252, Agenda: 9.1.2, ZTE Corporation, Dec. 9-12, 2019, 4 pages.

"(TP for NR BL CR for TS 38.300): NG based UE context retrieval", 3GPP TSG-RAN WG3 Meeting #99bis, R3-182282, Ericsson, Apr. 16-20, 2018, 3 pages.

* cited by examiner

| IE/Group Name | Presence | Range | IE type and reference | Semantics description | Criticality | Assigned criticality |
|---|---|---|---|---|---|---|
| Message type | M | | 9.3.1.1 | | YES | reject |
| RAN UE NGAP ID | M | | 9.3.3.2 | | YES | reject |
| Source AMF UE NGAP ID | M | | AMF UE NGAP ID 9.3.3.1 | | YES | reject |
| User location information | M | | 9.3.1.16 | | YES | ignore |
| UE security capabilities | M | | 9.3.1.86 | | YES | ignore |
| UE context release and data forwarding flag for RRC inactive | O | | ENUMERATED (TRUE, FALSE,....) | | YES | ignore |
| Data forwarding info | | 1..\<maxnoofDRBs\> | | | — | |
| E-RAB ID | O | | INTEGER (0..15,....) | | — | |
| New anchor node DL Xn-U TNL information | O | | UP Transport layer information list 9.3.2.xx | Indicates the possibility to keep the NG-U GTP-U tunnel termination point at the target NG-RAN node | — | |

| IE/Group Name | Presence | Range | IE type and reference | Semantics description |
|---|---|---|---|---|
| UP transport layer information item | | 1..<maxnoofDRBs> | | |
| Xn-U UP TNL information | M | | UP transport layer information 9.3.2.xx | |

422
424

424 ⤴

| IE/Group Name | Presence | Range | IE type and reference | Semantics description |
|---|---|---|---|---|
| CHOICE UP transport layer information | M | | | |
| GTP tunnel | | | | |
| Endpoint IP address | M | | Transport layer address 9.3.2.4 | |
| GTP-TEID | M | | 9.3.2.5 | |

| IE/Group Name | Presence | Range | IE type and reference | Semantics description | Criticality | Assigned criticality |
|---|---|---|---|---|---|---|
| Message type | M | | 9.3.1.1 | | YES | ignore |
| RAN UE NGAP ID | M | | 9.3.3.2 | | YES | reject |
| RAN UE NGAP ID | M | | 9.3.3.2 | | YES | reject |
| UE context release and data Forwarding flag for RRC inactive | O | | ENUMERATED (TRUE, FALSE,...) | | YES | ignore |
| >Data forwarding info | | 1..<maxnoofDRBs> | | | - | |
| >>E-RAB ID | O | | INTEGER (0..15,...) | | - | |
| >>New anchor node DL Xn-U TNL information | O | | UP Transport layer information list 9.3.2.xx | Indicates the possibility to keep the NG-U GTP-U tunnel termination point at the target NG-RAN node | - | |

FIG. 4C

NG BASED CONTEXT RELEASE AND DATA FORWARDING FOR MULTI-HOP MOBILITY

TECHNICAL FIELD

This description relates to wireless communications, and in particular, inactive radio resource control state.

CROSS-REFERENCE TO RELATED APPLICATION

This application claims priority to Indian Provisional Application No. 202041039954 filed Sep. 15, 2020, the content of which is incorporated herein by reference in its entirety.

BACKGROUND

A communication system may be a facility that enables communication between two or more nodes or devices, such as fixed or mobile communication devices. Signals can be carried on wired or wireless carriers.

An example of a cellular communication system is an architecture that is being standardized by the 3rd Generation Partnership Project (3GPP). A recent development in this field is often referred to as the long-term evolution (LTE) of the Universal Mobile Telecommunications System (UMTS) radio-access technology. E-UTRA (evolved UMTS Terrestrial Radio Access) is the air interface of 3GPP's Long Term Evolution (LTE) upgrade path for mobile networks. In LTE, base stations or access points (APs), which are referred to as enhanced Node AP or Evolved Node B (eNBs), provide wireless access within a coverage area or cell. In LTE, mobile devices, or mobile stations are referred to as user equipments (UE). LTE has included a number of improvements or developments.

5G New Radio (NR) development is part of a continued mobile broadband evolution process to meet the requirements of 5G, similar to earlier evolution of 3G & 4G wireless networks. In addition, 5G is also targeted at the new emerging use cases in addition to mobile broadband. A goal of 5G is to provide significant improvement in wireless performance, which may include new levels of data rate, latency, reliability, and security. 5G NR may also scale to efficiently connect the massive Internet of Things (IoT), and may offer new types of mission-critical services. Ultra-reliable and low-latency communications (URLLC) devices may require high reliability and very low latency.

SUMMARY

Various example implementations are described and/or illustrated. The details of one or more examples of implementations are set forth in the accompanying drawings and the description below. Other features will be apparent from the description and drawings, and from the claims.

In an example embodiment, a method includes receiving, by a core network entity, a first message from a first network node, the first message including at least one of a user equipment context release request and a data forwarding request; detecting, by the core network entity, the at least one of the user equipment context release request and the data forwarding request from the first message; and sending, by the core network entity, a second message including at least one of a user equipment context release command and data forwarding information to a second network node based at least on the detected at least one of the user equipment context release request and the data forwarding request.

In an example embodiment, an apparatus includes one or more processors and one or more memories including computer program code. The one or more memories and the computer program code are configured to, with the one or more processors, cause the apparatus to receive a first message from a first network node, the first message including at least one of a user equipment context release request and a data forwarding request; detect the at least one of the user equipment context release request and the data forwarding request from the first message; and send a second message including at least one of a user equipment context release command and data forwarding information to a second network node based at least on the detected at least one of the user equipment context release request and the data forwarding request.

In an example embodiment, an apparatus includes means for receiving a first message from a first network node, the first message including at least one of a user equipment context release request and a data forwarding request; means for detecting the at least one of the user equipment context release request and the data forwarding request from the first message; and means for sending a second message including at least one of a user equipment context release command and data forwarding information to a second network node based at least on the detected at least one of the user equipment context release request and the data forwarding request.

In an example embodiment, a computer program product includes a computer-readable storage medium bearing computer program code embodied therein for use with a computer. The computer program code includes: code for receiving, by a core network entity, a first message from a first network node, the first message including at least one of a user equipment context release request and a data forwarding request; code for detecting, by the core network entity, the at least one of the user equipment context release request and the data forwarding request from the first message; and code for sending, by the core network entity, a second message including at least one of a user equipment context release command and data forwarding information to a second network node based at least on the detected at least one of the user equipment context release request and the data forwarding request.

In an example embodiment, a method includes, when operating as a first network node, sending a first message to a core network entity, the first message including at least one of a user equipment context release request and a data forwarding request; and receiving data of the user equipment from a second network node, wherein the data received is based at least on the data forwarding request. The method further includes, when operating as a second network node, receiving a second message from a core network entity, the second message including at least one of a user equipment context release command and data forwarding information; performing context release of a user equipment; and sending data of the user equipment to a first network node, wherein the data sent to the first network node is based at least on the data forwarding information received from the core network entity.

In an example embodiment, an apparatus includes one or more processors and one or more memories including computer program code. The one or more memories and the computer program code are configured to, with the one or more processors, cause the apparatus to, when operating as a first network node, send a first message to a core network entity, the first message including at least one of a user equipment context release request and a data forwarding request; and receive data of the user equipment from a second network node, wherein the data received is based at least on the data forwarding request. The one or more memories and the computer program code are configured to, with the one or more processors, cause the apparatus further to, when operating as a second network node, receive a second message from a core network entity, the second message including at least one of a user equipment context release command and data forwarding information; perform context release of a user equipment; and send data of the user equipment to a first network node, wherein the data sent to the first network node is based at least on the data forwarding information received from the core network entity.

In an example embodiment, an apparatus includes, when operating as a first network node, means for sending a first message to a core network entity, the first message including at least one of a user equipment context release request and a data forwarding request; and means for receiving data of the user equipment from a second network node, wherein the data received is based at least on the data forwarding request. The apparatus further includes, when operating as a second network node, means for receiving a second message from a core network entity, the second message including at least one of a user equipment context release command and data forwarding information; means for performing context release of a user equipment; and means for sending data of the user equipment to a first network node, wherein the data sent to the first network node is based at least on the data forwarding information received from the core network entity.

In an example embodiment, a computer program product includes a computer-readable storage medium bearing computer program code embodied therein for use with a computer. The computer program code includes, by a first network node, code for sending a first message to a core network entity, the first message including at least one of a user equipment context release request and a data forwarding request; and code for receiving data of the user equipment from a second network node, wherein the data received is based at least on the data forwarding request. The computer program code further includes, by a second network node, code for receiving a second message from a core network entity, the second message including at least one of a user equipment context release command and data forwarding information; code for performing context release of a user equipment; and code for sending data of the user equipment to a first network node, wherein the data sent to the first network node is based at least on the data forwarding information received from the core network entity.

BRIEF DESCRIPTION OF THE DRAWINGS

FIG. 4A illustrates an example path switch request message sent from the serving gNB to an AMF, according to an example implementation.

FIG. 4B illustrates an example UP transport layer information list and UP transport layer information, according to an example implementation.

FIG. 4C illustrates an example UE context release request sent from a serving gNB to an AMF, according to an example implementation.

DETAILED DESCRIPTION

Figure 1:
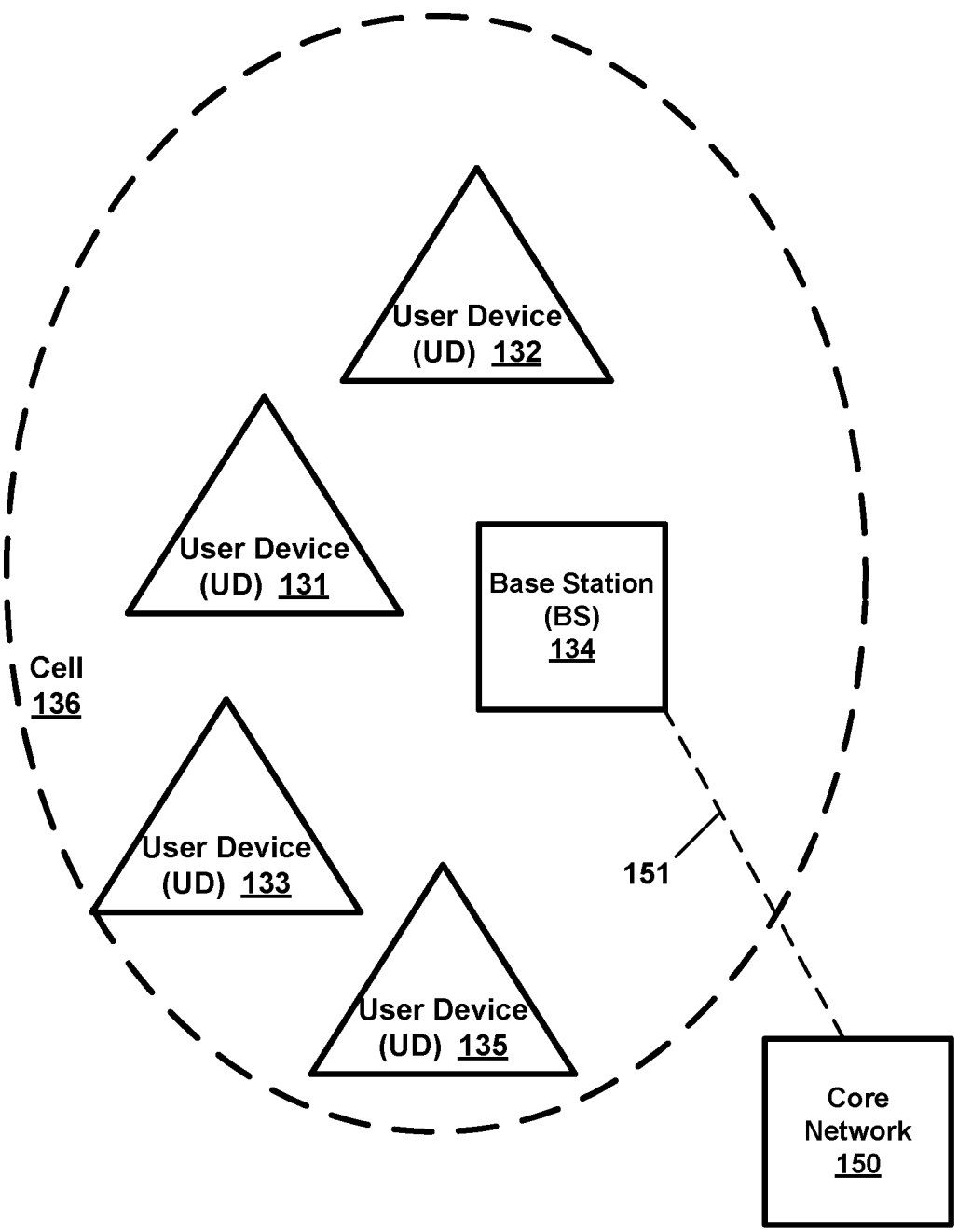
FIG. 1 is a block diagram of a wireless network according to an example implementation.

FIG. 1 is a block diagram of a wireless network 130 according to an example implementation. In the wireless network 130 of FIG. 1, user devices (UDs) 131, 132, 133 and 135, which may also be referred to as mobile stations (MSs) or user equipment (UEs), may be connected (and in communication) with a base station (BS) 134, which may also be referred to as an access point (AP), an enhanced Node B (eNB), a next-generation Node B (gNB), a next generation radio access network (NG RAN) node, or a network node. At least part of the functionalities of an access point (AP), base station (BS), (e)Node B (eNB), or gNB may also be carried out by any node, server or host which may be operably coupled to a transceiver, such as a remote radio head. BS (or AP) 134 provides wireless coverage within a cell 136, including to user devices 131, 132, 133 and 135. Although only four user devices are shown as being connected or attached to BS 134, any number of user devices may be provided. BS 134 is also connected to a core network 150 via an interface 151. This is merely one simple example of a wireless network, and others may be used.

A user device (user terminal, user equipment (UE)) may refer to a portable computing device that includes wireless mobile communication devices operating with or without a subscriber identification module (SIM), including, but not limited to, the following types of devices: a mobile station (MS), a mobile phone, a cell phone, a smartphone, a personal digital assistant (PDA), a handset, a device using a wireless modem (alarm or measurement device, etc.), a laptop and/or touch screen computer, a tablet, a phablet, a game console, a notebook, and a multimedia device, as examples, or any other wireless device. It should be appreciated that a user device may also be a nearly exclusive uplink only device, of which an example is a camera or video camera loading images or video clips to a network.

In LTE (as an example), core network 150 may be referred to as Evolved Packet Core (EPC), which may include a mobility management entity (MME) which may handle or assist with mobility/handover of user devices between BSs, one or more gateways that may forward data and control signals between the BSs and packet data networks or the Internet, and other control functions or blocks. In 5G (as another example), core network 150 may be referred to as 5G Core (5GC), which may include at least an access and mobility management function (AMF) and a session management function (SMF). The AMF may assist with various operations, e.g., mobility management, registration management, connection management, etc and the SMF may assist with other operations, e.g., session management, Internet protocol (IP) address allocation & management for UE, user plane selection, etc.

In addition, by way of illustrative example, the various example implementations or techniques described herein may be applied to various types of user devices or data service types, or may apply to user devices that may have multiple applications running thereon that may be of different data service types. New Radio (5G) development may support a number of different applications or a number of different data service types, such as for example: machine type communications (MTC), enhanced machine type communication (eMTC), Internet of Things (IoT), and/or narrowband IoT user devices, enhanced mobile broadband (eMBB), and ultra-reliable and low-latency communications (URLLC).

IoT may refer to an ever-growing group of objects that may have Internet or network connectivity, so that these objects may send information to and receive information from other network devices. For example, many sensor type applications or devices may monitor a physical condition or a status, and may send a report to a server or other network device, e.g., when an event occurs. Machine Type Communications (MTC or machine to machine communications) may, for example, be characterized by fully automatic data generation, exchange, processing and actuation among intelligent machines, with or without intervention of humans. Enhanced mobile broadband (eMBB) may support much higher data rates than currently available in LTE.

Ultra-reliable and low-latency communications (URLLC) is a new data service type, or new usage scenario, which may be supported for New Radio (5G) systems. This enables emerging new applications and services, such as industrial automations, autonomous driving, vehicular safety, e-health services, and so on. 3GPP targets in providing up to e.g., 1 ms U-Plane (user/data plane) latency connectivity with 1-1e-5 reliability, by way of an illustrative example. Thus, for example, URLLC user devices/UEs may require a significantly lower block error rate than other types of user devices/UEs as well as low latency. Thus, for example, a URLLC UE (or URLLC application on a UE) may require much shorter latency, as compared to an eMBB UE (or an eMBB application running on a UE).

The various example implementations may be applied to a wide variety of wireless technologies or wireless networks, such as LTE, LTE-A, 5G, IoT, MTC, eMTC, eMBB, URLLC, etc., or any other wireless network or wireless technology. These example networks, technologies or data service types are provided only as illustrative examples.

Multiple Input, Multiple Output (MIMO) may refer to a technique for increasing the capacity of a radio link using multiple transmit and receive antennas to exploit multipath propagation. MIMO may include the use of multiple antennas at the transmitter and/or the receiver. MIMO may include a multi-dimensional approach that transmits and receives two or more unique data streams through one radio channel. For example, MIMO may refer to a technique for sending and receiving more than one data signal simultaneously over the same radio channel by exploiting multipath propagation. According to an illustrative example, multi-user multiple input, multiple output (multi-user MIMO, or MU-MIMO) enhances MIMO technology by allowing a base station (BS) or other wireless node to simultaneously transmit or receive multiple streams to different user devices or UEs, which may include simultaneously transmitting a first stream to a first UE, and a second stream to a second UE, via a same (or common or shared) set of physical resource blocks (PRBs) (e.g., where each PRB may include a set of time-frequency resources).

Also, a BS may use precoding to transmit data to a UE (based on a precoder matrix or precoder vector for the UE). For example, a UE may receive reference signals or pilot signals, and may determine a quantized version of a DL channel estimate, and then provide the BS with an indication of the quantized DL channel estimate. The BS may determine a precoder matrix based on the quantized channel estimate, where the precoder matrix may be used to focus or direct transmitted signal energy in the best channel direction for the UE. Also, each UE may use a decoder matrix may be determined, e.g., where the UE may receive reference signals from the BS, determine a channel estimate of the DL channel, and then determine a decoder matrix for the DL channel based on the DL channel estimate. For example, a precoder matrix may indicate antenna weights (e.g., an amplitude/gain and phase for each weight) to be applied to an antenna array of a transmitting wireless device. Likewise, a decoder matrix may indicate antenna weights (e.g., an amplitude/gain and phase for each weight) to be applied to an antenna array of a receiving wireless device. This applies to UL as well when a UE is transmitting data to a BS.

For example, according to an example aspect, a receiving wireless user device may determine a precoder matrix using Interference Rejection Combining (IRC) in which the user device may receive reference signals (or other signals) from a number of BSs (e.g., and may measure a signal strength, signal power, or other signal parameter for a signal received from each BS), and may generate a decoder matrix that may suppress or reduce signals from one or more interferers (or interfering cells or BSs), e.g., by providing a null (or very low antenna gain) in the direction of the interfering signal, in order to increase a signal-to interference plus noise ratio (SINR) of a desired signal. In order to reduce the overall interference from a number of different interferers, a receiver may use, for example, a Linear Minimum Mean Square Error Interference Rejection Combining (LMMSE-IRC) receiver to determine a decoding matrix. The IRC receiver and LMMSE-IRC receiver are merely examples, and other types of receivers or techniques may be used to determine a decoder matrix. After the decoder matrix has been determined, the receiving UE/user device may apply antenna weights (e.g., each antenna weight including amplitude and phase) to a plurality of antennas at the receiving UE or device based on the decoder matrix. Similarly, a precoder matrix may include antenna weights that may be applied to antennas of a transmitting wireless device or node. This applies to a receiving BS as well.

A 5G/NR UE may be in one of the following radio resource control (RRC) states—RRC_CONNECTED (e.g., RRC connected), RRC_INACTIVE (e.g., RRC inactive), or RRC_IDLE (e.g., RRC idle). The RRC inactive state was introduced in 3GPP Rel-15 to reduce UE power consumption by alleviating control plane (CP) procedures required at RRC state change and associated latency. A UE is in RRC connected state when both radio and core network connections are established. If neither the radio and core network connections are established, the UE is in RRC idle state. A UE transitions (may be moved by the network as well) from RRC connected state to RRC inactive state after a certain data inactivity period (e.g., based on a timer). When the UE is in the RRC inactive state, the radio connection is suspended while core network (CN) connectivity is maintained (e.g., UE is in a connection management (CM)-CONNECTED state).

Upon transition of a UE to RRC inactive state, UE access stratum (AS) context (also referred to as UE context in the present disclosure) is stored at both the UE and a radio access network (RAN). The UE context includes the latest radio bearer configuration used for data/signaling transmission, security keys, algorithms for integrity protection, and/or ciphering in the radio interface. The UE can use the stored information to resume the radio connection and can restore the security context with lower delay and signalling overhead as compared to a UE in RRC idle state that needs to establish a new connection to both the radio and core networks. In response to a RRC resume request from the UE to resume the radio connection, the network may perform one of the following: resume a suspended RRC connection and send the UE to RRC connected state, reject the request and send the UE to RRC inactive state (e.g., with a wait timer), directly re-suspend the RRC connection and send the UE to RRC inactive state, directly release the RRC connection and send the UE to RRC idle state, or instruct the UE to initiate non-access stratum (NAS) level recovery (e.g., network sends an RRC setup message).

A UE in RRC inactive state can be configured by the last serving network node (e.g., the network node or next generation radio access network node (NG-RAN) node/gNB serving the UE prior to the UE transitioning to RRC inactive state) with a RAN notification area (RNA). The RNA can cover one or more cells and may be included in one CN registration area (e.g., a tracking area). In addition, Xn connectivity is typically available between the network nodes within an RNA. A UE in RRC inactive state can send RAN notification area updates (RNAUs) periodically and/or when a cell reselection procedure of the UE selects a cell that does not belong to the configured RNA.

A UE can move within the configured RNA without any notifications about its location as cell reselections within the RNA are transparent to the network. The UE can resume its radio connection in any cell using a unique identifier, e.g., an inactive-radio network temporary identifier (I-RNTI), which is intended to identify both the last serving network node (e.g., also referred as anchor node) and the UE itself. The last serving network node also keeps the UE-associated connection with a serving access and mobility management function (AMF) and a user plane function (UPF).

A UE in inactive state can request to resume its suspended RRC connection prior to UL data transmission, in response to a paging message for DL data reception, for RNAU procedure which is triggered periodically by the UE, and/or when the UE reselects a cell outside the configured RNA. If the UE attempts to access a new network node other than the last serving network node, an XnAP Retrieve UE Context procedure is initiated at the new network node to get the UE context from the last serving node identified through the I-RNTI and/or to determine whether the UE is authorized to access the network. This may also trigger an Xn-UP Address Indication procedure including provisioning of user plane tunnel endpoint information for potential recovery of pending data from the last serving node. Upon successful retrieval of the UE context, the new network node becomes the serving network node and the UE is moved to RRC connected state. A next generation application protocol (NGAP) path switch procedure may be further initiated at the new serving node to update the user plane (UP) connection to the 5G core network (5GC) from the last serving network node to the new serving network node. Upon completion of the path switch procedure, the new serving network node may trigger the release of the UE context stored at the last serving node by means of the XnAP UE context release procedure.

Figure 2:
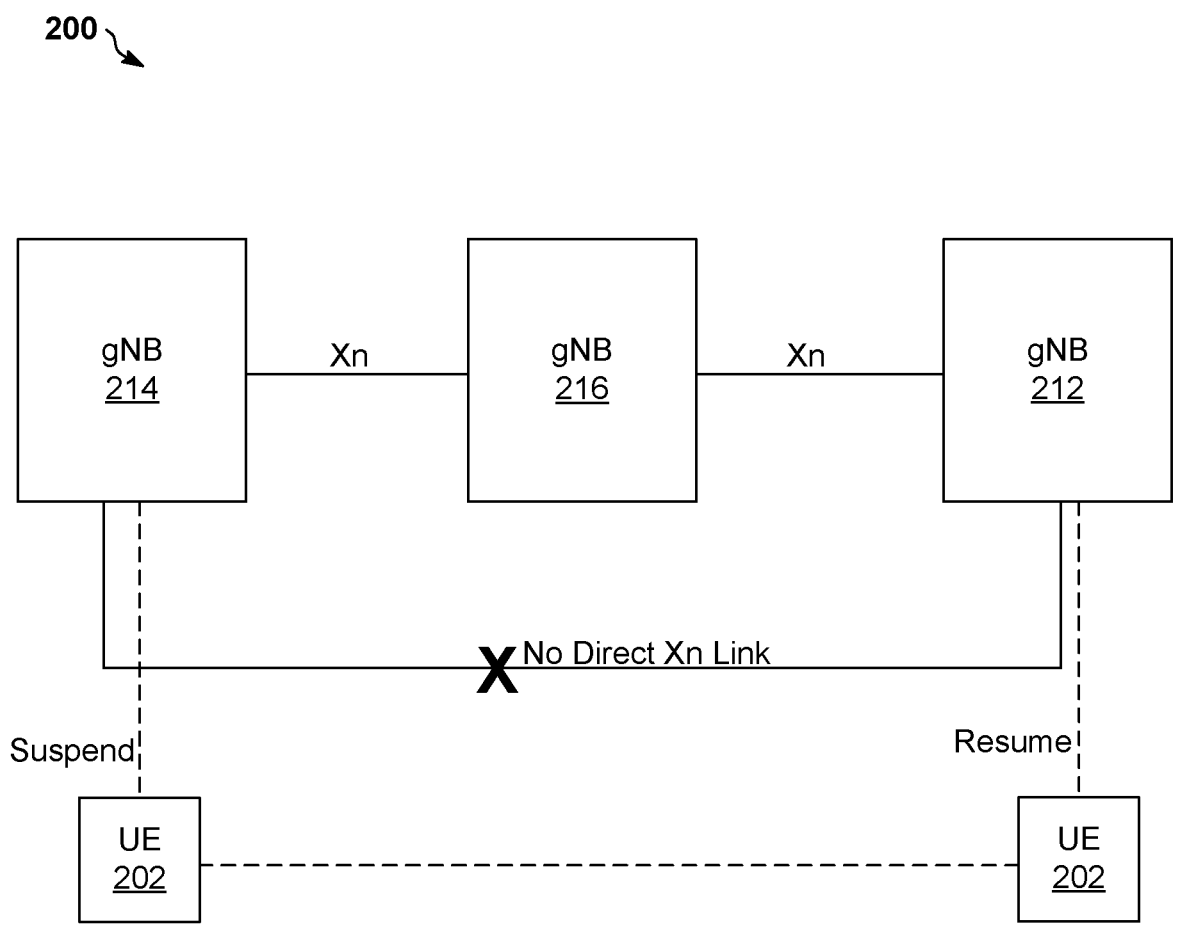
FIG. 2 illustrates an example scenario in which a UE in RRC inactive state resumes its connection in a network node with no direct Xn connection to the last serving network node.

FIG. 2 illustrates an example scenario 200 in which a UE in RRC inactive state resumes its connection in a network node (e.g., gNB 212) with no direct Xn connection to the last serving network node (e.g., gNB 214).

In the example scenario illustrated in FIG. 2, a UE, e.g., UE 202 (which may be the same or similar to user device 131 of FIG. 1) may have transitioned to RRC inactive state when the UE was connected to gNB 214 (which may be the same or similar to base station 134 of FIG. 1). However, when the UE tries to resume its radio connection, for example, by initiating a transition to an RRC connected state, the UE may be outside its RNA and may resume its radio connectivity by connecting to gNB 212 (which may be the same or similar to base station 134 of FIG. 1). However, gNB 212 may not have a direct Xn connection to gNB 214 but may have an indirect Xn connection via gNB 216. In other words, gNB 212 may have an indirect Xn connection via multiple hops, for example, via gNB 216, as gNB 216 may be neighbors with both gNBs 212 and 214, and gNB 216 has direct Xn connections to both gNBs 212 and 214. As described earlier, direct Xn connectivity between gNBs may be available within a UE's RNA and indirect Xn connectivity may be present between a gNB outside the UE's RNA and the last serving gNB. Although, only one neighbor gNB (e.g., gNB 216) is illustrated in FIG. 2, gNB 212 may have an indirect Xn connection to gNB 214 via multiple gNBs (e.g., gNB 212 ☐ gNB 216 ☐ gNB ** ☐ gNB 214). The use of gNB 216 for an indirect Xn connection is just one example implementation, and other implementations with a plurality of neighbor gNBs (acting as hops in a multi-hop procedure) may be supported. A multi-hop mobility scenario may include a UE in which the UE (e.g., in an inactive RRC state) changes gNBs and UE context retrieval may be performed.

In the above described scenario, it should be noted that multi-hop UE context retrieval is supported. For example, to ensure that a gNB outside the RNA (e.g., gNB 212) is able to retrieve the UE context from the last serving gNB (e.g., gNB 214) despite the lack of direct Xn connectivity, the gNB outside the RNA (e.g., gNB 212) may be able to retrieve the UE context from the last serving gNB (e.g., gNB 214) via a common neighbor gNB (e.g., gNB 216) that can relay both the context request and context response.

In the example scenario illustrated in FIG. 2, a 5G UE, e.g., UE 202, may be transitioned to RRC inactive state in gNB 214 and may be configured with a RNA, e.g., RNA1, including gNB 216, which has a direct Xn connectivity with gNB 212. gNB 212 may be outside RNA1 and an RNAU is performed at gNB 212. It should be noted that there is no direct Xn connection between gNB 212 and gNB 214 as gNB 212 is outside RNA1. However, a direct Xn connection exists between gNB 212 and gNB 216. When the UE resumes its RRC connection at a gNB, e.g., gNB 212, outside its RNA (e.g., outside RNA1), UE context retrieval, downlink data forwarding, and UE context release may have to be performed. However, enabling these procedures may be challenging and/or inefficient due to lack of direct Xn connectivity between gNBs 212 and 214. In some implementation, RNAU may be performed due to periodic updates.

Moreover, the data forwarding allows for forwarding of DL data not transmitted and that may be present at the network, e.g., at the last serving node, gNB 214, which for instance may have arrived in the gNB's buffer around/during the RRC resume procedure. In the legacy data forwarding, this involves gNB 212 providing downlink (DL) tunnel end-point identifier (TEID) information to the last serving gNB (e.g., gNB 214) in the Xn-UAddress Indication over Xn connection. This may also involve forwarding the TEID information from gNB-CU-CP to gNB-CU-UP over the E1 interface at both target and anchor gNBs (e.g., gNBs 212 and 214, respectively), since the data forwarding is performed by gNB-CU-UP. The signaling overhead is significant as there could be multiple hops in retrieving the UE context.

It should be noted that when the UE context retrieval happens over multiple-Xn-hops as described above, the data forwarding also becomes an issue. Although data forwarding could be supported over multiple Xn hops (similarly to the context retrieval), signalling and forwarding would have to be performed at each intermediate node, which in turn would result in undesired signalling overhead and making this approach inefficient. After a successful UE context retrieval at gNB 212 (e.g., using multiple Xn hops), and after the path switch completion, the UE context release also could adopt a multi-hop solution which is not optimal due to signaling overhead. In other words, the data forwarding and UE context release procedures needed in inter-gNB UE resumption scenarios with no direct Xn connectivity and where multi-hop Xn based UE context retrieval is adopted results in extensive signaling overhead. Therefore, there is a need and/or desire to support context release and/or data forwarding for multi-hop mobility in an efficient manner.

In an example implementation, the present disclosure recites a mechanism/procedure where the context release is initiated by an access management function (AMF) after the context relocation to the new NG-RAN node (e.g., new serving node). In some implementations, for example, the new serving node may include an indication (e.g., a flag) "UE context release required" in a message, such as for example, a path switch request to the AMF to indicate that an AMF initiated context release should be initiated towards the last serving node. The AMF may send a UE context release command to the last serving node based on which the UE context is released by the old serving node.

In an example implementation, the present disclosure also discloses that data forwarding information is provided by AMF to the last serving gNB to allow the last serving gNB to perform data forwarding to the new serving gNB (to avoid an Xn multi-hop procedure initiated by the new anchor NG-RAN node). In some implementations, for example, the new serving gNB may include a "data forwarding required" flag and/or the TEID(s) of the new serving gNB (e.g., TEID(s) of the gNB-CU-UP) to perform data forwarding (e.g., per established bearer) in a message, such as for example, the path switch request or a different message, to the AMF. The AMF may subsequently include the received information in the UE context release command or a different message, which in turn may trigger the last serving gNB to initiate data forwarding to the new serving gNB.

In another example implementation, the new serving gNB may use a single flag (or IE) to indicate both the data forwarding required and UE context release required as part of the path switch request to the AMF.

Figure 3:
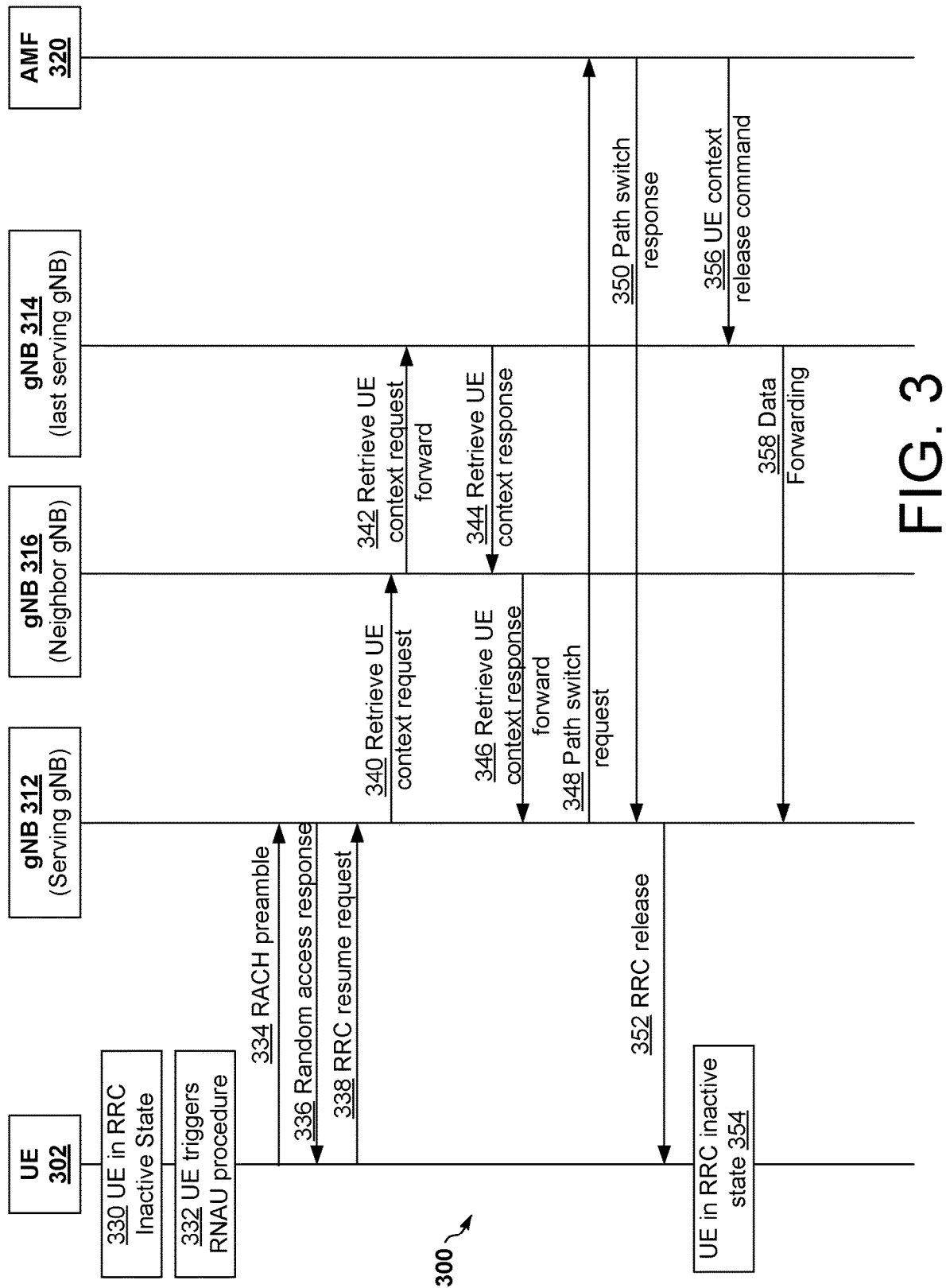
FIG. 3 illustrates a signaling flow for NG based context release and data forwarding for Xn based multi-hop context retrieval, according to an example implementation.

FIG. 3 illustrates a signaling flow 300 for NG based context release and data forwarding for multi-hop mobility, according to an example implementation.

In an example implementation, FIG. 3 illustrates a user equipment, e.g., UE 302 (which may be same as or similar to UE 202 of FIG. 2), gNB 312 (which may be same as or similar to gNB 212), gNB 314 (which may be same as or similar to gNB 214), and/or gNB 316 (which may be same as or similar to gNB 216). In the present disclosure, in some implementations, for example, gNB 312 may be referred to as the serving gNB 312, gNB 314 may be referred to as last serving gNB, and/or gNB 316 may be referred to as a neighbor gNB 316.

At 330, UE 302 may be in an RRC inactive state. As described above in reference to FIG. 2, the UE may have transitioned to RRC inactive state when the UE was connected to gNB 314 (last serving node) and configured with RNA1. After transitioning to RRC inactive state, the UE may have moved outside of its RNA and configured with another RNA (e.g., RNA2).

At 332, UE 302 may trigger a RNAU upon detecting that it is outside RNA1. For example, when the UE moves out of RAN1 (e.g., RNA1 cell list), the UE may report its location change. In an example implementation, the UE may report its location change via the serving gNB, e.g., gNB 312. The crossing of the RNA1 may be indicated by performing an RNAU using a random access procedure.

At 334, UE 302 may initiate an RRC resume procedure. In an example implementation, the random access procedure may be a four-step random access procedure and the UE may select an available preamble sequence and send the preamble sequence along with its own identity (e.g., random access radio network temporary identity (RA-RNTI)). The four-step random access procedure used herein is just an example implementation, and other procedures, for example, a two-step random access procedure, or a small data transmission (SDT) from the RRC inactive state using random access or preconfigured resource-based transmission, etc., may be used as well.

At 336, gNB 312 may send a random access response to the UE. In an example implementation, gNB 312 may send the random access response to the UE via a downlink shared channel addressed to the RA-RNTI of the UE. In some implementations, for example, the random access response may include a temporary cell-radio network temporary identity (C-RNTI) for further communication with the UE, a timing advance value, and/or uplink grant resources.

At 338, UE 312 may send an RRC resume request to gNB 312.

In some implementations, for example, as described earlier, if a UE in RRC inactive state attempts to access a network node that is different from the last serving node, e.g., gNB 314, in some implementations, for example, the new gNB, e.g., gNB 312 may send a retrieve UE context request to the last serving node (e.g., gNB 314). Since gNB 312 does not have a direct Xn connection to gNB 314, the retrieve UE context request may be sent to a neighbor network node, e.g., gNB 316, which may have direct Xn connections with both gNBs 312 and 314.

At 340, gNB 312 may send a retrieve UE context request to gNB 316. The retrieve UE context request requests the old NG-RAN node to transfer the UE context to the new gNB. Since gNBs 312 and 314 do not have a direct Xn connection, gNB 312 may send the retrieve UE context request message to a neighbor node, e.g., gNB 316, that has direct Xn connections to both gNBs 312 and 314. In an example implementation, gNB 312 may send the retrieve UE context request to gNB 316.

At 342, gNB 316 may forward the retrieve UE context request to gNB 314. In some implementations, for example, the retrieve UE context request may include an indication that the request is a "multi-hop" request or that the request should be forwarded, or a combination thereof. In addition, in some implementations, for example, the address to which the request should be forwarded may be indicated explicitly as a new IE in the forwarded request or implicitly by including the I-RNTI which may include some bits that represent the gNB ID of the last serving node (e.g., gNB 314). For example, the retrieve UE context request may contain the IE: Context ID, which may include the I-RNTI constructed based on the UE ID and the last serving node (e.g., gNB 314). Moreover, in some implementations, for example, the serving gNB (e.g., gNB 312) may determine whether a multi-hop context retrieval is possible based on the neighbor's neighbor information shared during Xn setup procedure.

At 344, gNB 314 sends the retrieve UE context response to gNB 316. In some implementations, for example, in response to receiving of retrieve UE context request, gNB 344 identifies the UE context based on the UE context ID and sends the UE context response, which may include the UE context to gNB 316.

At 346, gNB 316 may forward the retrieve UE context retrieve response received from gNB 314 to gNB 312.

At 348, UE 302 may send a path switch request to an AMF, e.g., 320. The AMF of a 5GC is responsible for handling connection and mobility management tasks and messages related to session management are forwarded over N11 reference interface to a session management function (SMF). In some implementations, for example, the path switch request may be used to establish a UE associated signalling connection to 5GC and, if applicable, to request switching of the downlink termination point of the user transport bearer toward a new termination point (e.g., gNB 312). An example implementation of path switch request 348 is illustrated in FIG. 4A.

Upon receiving of the path switch request, the AMF may transfer the path switch request transfer information element (IE) to the SMF associated with the concerned PDU session for each PDU session indicated in the PDU Session ID IE. After all necessary updates including the UP path switch procedure has been successfully completed in the 5GC for at least one of the PDU session resources included in the path switch request, the AMF, at 350, may send a path switch response (e.g., a path switch request acknowledge) to gNB 312.

In some implementations, for example, path switch request 348 may include one or more flags or information elements (IEs) which may include (or indicate) a UE context release request and/or a data forwarding request. Optionally, in some implementations, for example, path switch request 348 may further include a UE context identifier which may be used to identify a last serving node (e.g., gNB 314) in a UE context based at least on the UE context identifier.

In some implementations, the serving gNB (e.g., gNB 312) may send the UE context release request and/or data forwarding request in other message instead of path switch request to AMF 320, for example, in UE context release request message as illustrated in FIG. 4C.

At 352, gNB 312 may send an RRC release to the UE.

In some implementations, for example, the path switch request sent by gNB 312 to AMF 320 may include one or more indications (e.g., flags, IEs, etc.) related to UE context release and/or forwarding of data. In an example implementation, the path switch request may include an indication related to the UE context release request which indicates to the AMF to request the last serving gNB (e.g., gNB 314) to release the UE context at the last serving gNB. In an additional example implementation, the path switch request may include an indication related to the forwarding of data which indicates to the AMF to request the last serving gNB (e.g., gNB 314) to forward the downlink data buffered at gNB 314 to gNB 312.

At 356, AMF 320 may send a UE context release command to gNB 314. In some implementations, the UE context release command indicates to gNB 314 to release the UE context stored at gNB 314. In addition, AMF 320 may also send the data forwarding information so that gNB 314 knows the TEID(s) to send the data to gNB 312.

At 358, gNB 316 may forward the downlink data of UE 302 buffered at gNB 316 to gNB 312 based at least on the TEID(s) received from AMF 320. It should be noted that in this example, gNB 312 sends the UE context release request, meant for last serving gNB, directly to the AMF along with the data forwarding information to minimize the signaling overhead associated with multi-hop scheme described earlier.

Thus, an efficient NG based context release and data forwarding for Xn based multi-hop context retrieval may be achieved.

FIG. 4A illustrates an example path switch request message 400 sent from the serving gNB (e.g., gNB 312) to an AMF (e.g., AMF 320), according to an example implementation.

In some implementations, for example, the path switch request message is sent from gNB 312 to AMF 320 to inform the AMF of the new serving gNB and to transfer some NG-U DL termination point(s) to the SMF via the AMF for one or more protocol data unit (PDU) session resources. In an example implementation, 402, 404, 406, and/or 408 illustrate new fields added to the path switch request message to support NG based context release and data forwarding for multi-hop mobility as described in the present disclosure. It should be noted that only a portion of the path switch request is being illustrated in FIG. 4A as an example implementation to illustrate the new fields (e.g., 402, 404, 406, and 408) being added.

FIG. 4B illustrates an example UP transport layer information list 420 and UP transport layer information 424, according to an example implementation.

In some implementations, for example, UP transport layer information list 420 may include fields UP transport layer information item 422 and Xn-U UP TNL information 424. In addition, in some implementations, UP transport layer information 424 may include fields CHOICE UP transport layer information 442, GTP tunnel 444, Endpoint IP address 444, and/or GTP-TEID 448 to support NG based data forwarding for multi-hop mobility as described in the present disclosure. For example, the newly added fields include a flag to indicate if the AMF is requested to trigger the UE context release towards the last serving gNB (e.g., gNB 314) and TEIDs on the serving gNB side (e.g., gNB 312). These are used to provide UP transport layer information associated with Xn user plane transport for one or more DRBs for which data forwarding is requested and which may include the transport layer address and port number for the forwarding the last serving gNB's UP data. It should be noted that this is just an example implementation and not a limitation.

FIG. 4C illustrates an example UE context release request message 480 sent from the serving gNB (e.g., gNB 312) to the AMF (e.g., AMF 320), according to an example implementation.

In some implementations, for example, UE context release request message 480 may be transmitted from gNB 312 to AMF 320 (for example, instead of the user equipment context release request being included as a flag in path switch request 348). In an example implementation, the UE context release request message 480 may be sent from gNB 312 to AMF 320, over the NG interface, to request the release of the UE-associated logical NG-connection at the last serving gNB. In an example implementation, 482, 484, and/or 486 illustrate new fields added to the UE context release request message 480 to support NG based context release and data forwarding for multi-hop mobility as described in the present disclosure. For example, the UE context release request message 480 may be an indication from serving gNB 312 to AMF 320 that the UE context release at the last serving node (e.g., gNB 314) has to be triggered by the AMF (in other words, requesting the AMF to trigger such procedure) for the UE. Similarly, the UE context release request message may indicate that data forwarding has to be triggered by the AMF.

Figure 5:
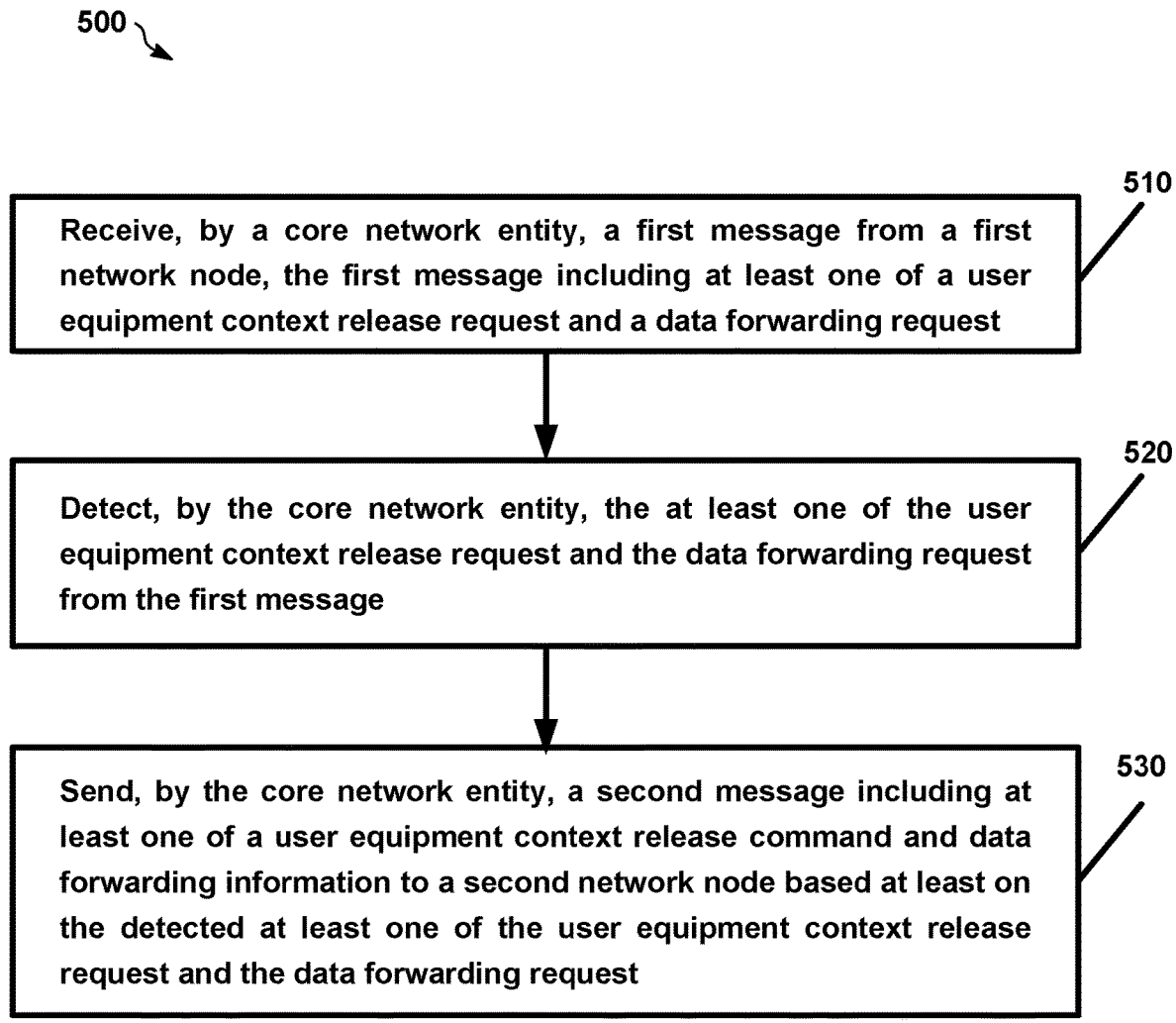
FIGS. 5-7 are flow charts illustrating NG based context release and data forwarding for Xn based multi-hop context retrieval, according to example implementations.

FIG. 5 is a flow chart 500 illustrating NG based context release and data forwarding for Xn based multi-hop context retrieval, according to an example implementation.

In an example, at block 510, a core network entity, e.g., AMF 320, may receive a first message from a first network node, e.g., gNB 312. In some implementations, for example, the first message may include a path switch request message 348 which may further include a UE context release request and/or a data forwarding request.

At block 520, AMF 320 may detect (or determine) the user equipment context release request and/or the data forwarding request from the first message.

At block 530, AMF 320 may send a second message including at least one of a user equipment context release command and data forwarding information to a second network node. In some implementations, for example, the AMF may send a UE context release command 356 along with data forwarding information to gNB 314. It should be noted that the second message is sent to gNB 314 based at least on the detected at least one of the user equipment context release request and the data forwarding request, for example, at block 520. In an example implementation, the UE context release command may be based on the UE context release request of path switch request 348. In an additional example implementation, the data forwarding information may be based on the data forwarding request of path switch request 348.

In some implementations, for example, the data forwarding request may include one more TEIDs. The AMF identifies the TEIDs and includes them in the data forwarding information sent to gNB 314 which may be then used by gNB 314 to send downlink data buffered at gNB 314 to gNB 312.

In some implementations, for example, the AMF may receive the UE context release request and data forward request as one or more messages, one or more information elements (IEs), or a combination of one or two messages and/or one or two IEs. Similarly, in some implementations, for example, the AMF may send the UE context release command and data forwarding information as one or more messages, one or more information elements (IEs), or a combination of one or two messages and/or one or two IEs.

Thus, NG based context release and data forwarding for Xn based multi-hop context retrieval may be achieved.

Figure 6:
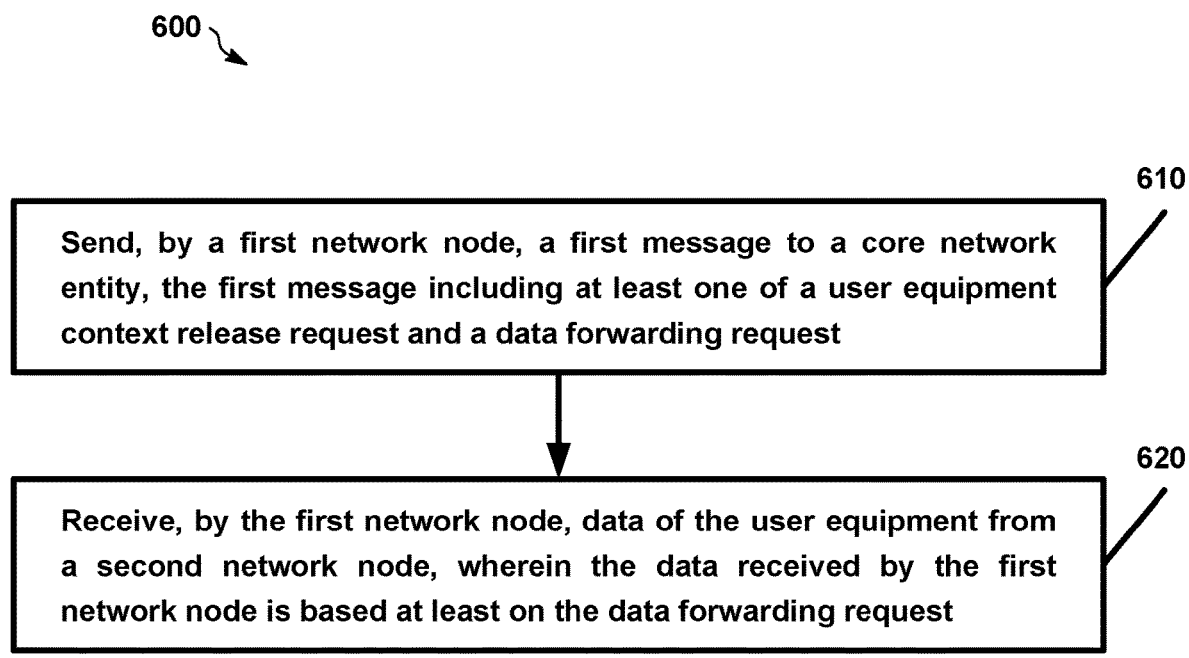

FIG. 6 is a flow chart 600 illustrating NG based context release and data forwarding for Xn based multi-hop context retrieval, according to an example implementation.

In an example, at block 610, a gNB, e.g., gNB 312 may send a first message to a core network entity. In some implementations, for example, gNB 312 may send a path switch request 348 to AMF 320. The path switch request may include a UE context release request and/or a data forwarding request.

At block 620, gNB 312 may receive data of the user equipment from a second network node. In some implementations, for example, gNB 312 may receive downlink data of UE 302 from gNB 316.

In some implementations, for example, the downlink data received from gNB 316 may be downlink data of the UE buffered at gNB 314. In an example implementation, gNB 312 may receive the downlink data based on the TEIDs included in path switch request 348, the TEIDs forwarded to gNB 314 via the AMF.

Thus, NG based context release and data forwarding for Xn based multi-hop context retrieval may be achieved.

Figure 7:
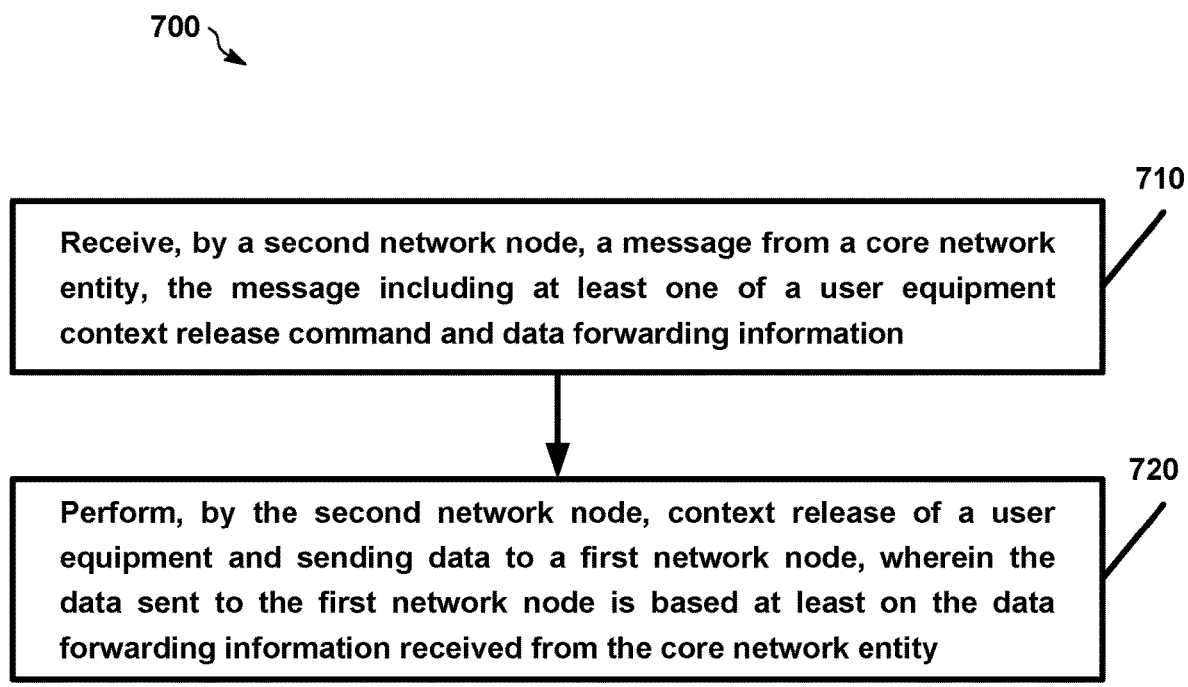

FIG. 7 is a flow chart 700 illustrating NG based context release and data forwarding for Xn based multi-hop context retrieval, according to an example implementation.

In an example, at block 710, a gNB, e.g., gNB 314 may receive a message from a core network entity. In some implementations, for example, gNB 314 may receive a UE context release command 356 from AMF 320. In an example implementation, the message received from the AMF may include data forwarding information, e.g., TEIDs.

At block 720, gNB 314 may perform context release of a user equipment and send data to a first network node. In some implementations, for example, the data sent to the first network node may be based at least on the data forwarding information received from AMF 320.

Thus, NG based context release and data forwarding for Xn based multi-hop context retrieval may be achieved.

Additional example implementations are described herein.

Example 1. A method of communications, comprising: receiving, by a core network entity, a first message from a first network node, the first message including at least one of a user equipment context release request and a data forwarding request; detecting, by the core network entity, the at least one of the user equipment context release request and the data forwarding request from the first message; and sending, by the core network entity, a second message including at least one of a user equipment context release command and data forwarding information to a second network node based at least on the detected at least one of the user equipment context release request and the data forwarding request.

Example 2. The method of Example 1, wherein the first message further includes a user equipment context identifier.

Example 3. The method of any of Examples 1-2, further comprising: identifying a second network node in a UE context based at least on the UE context identifier received in the first message.

Example 4. The method of any of Examples 1-3, wherein the core network entity is an access management function.

Example 5. The method of any of Examples 1-4, wherein the user equipment context release command is sent to the second network node based at least on the user equipment context release request.

Example 6. The method of any of Examples 1-5, wherein data forwarding request includes one or more tunnel endpoint identifiers of the first network node.

Example 7. The method of any of Examples 1-6, further comprising:
identifying the one or more tunnel endpoint identifiers from the first message; and including the one or more tunnel endpoint identifiers in the data forwarding information.

Example 8. The method of any of Examples 1-7, wherein the user equipment context release request and the data forwarding request are received in one or more messages.

Example 9. The method of any of Examples 1-8, wherein the user equipment context release command and the data forwarding information are sent in one or more messages.

Example 10. The method of any of Examples 1-9, further comprising: sending a response message to the first network node in response to the receiving of the first message.

Example 11. The method of any of Examples 1-10, wherein the first message is a path switch request message and/or the response message is a path switch request acknowledge message, and/or the second message is a user equipment context release command message.

Example 12. A method of communications, comprising: sending, by a first network node, a first message to a core network entity, the first message including at least one of a user equipment context release request and a data forwarding request; and receiving, by the first network node, data of the user equipment from a second network node, wherein the data received by the first network node is based at least on the data forwarding request.

Example 13. The method of Example 12, wherein the first message further includes a user equipment context identifier.

Example 14. The method of any of Examples 12-13, further comprising: retrieving, over an Xn interface, a user equipment context stored at the second network node for a user equipment, and wherein the sending is performed after the retrieving.

Example 15. The method of any of Examples 12-14, wherein the data to be forwarded is buffered or received at the second network node.

Example 16. The method of any of Examples 12-15, wherein the data received by the first network node based at least on the data forwarding request is based at least on a tunnel endpoint identifier included in the data forwarding request.

Example 17. The method of any of Examples 12-16, further comprising: receiving a response message from the core network entity in response to the transmitting of the first message.

Example 18. The method of any of Examples 12-17, further comprising: sending a user equipment context retrieve request to a third network node for forwarding to the second network node; and receive a context retrieve response from the third network node in response to the sending of the context retrieve request to a third network node, wherein the context retrieve response includes the user equipment context.

Example 19. A method of communications, comprising: receiving, by a second network node, a message from a core network entity, the message including at least one of a user equipment context release command and data forwarding information; and performing, by the second network node, context release of a user equipment and sending data to a first network node, wherein the data sent to the first network node is based at least on the data forwarding information received from the core network entity.

Example 20. The method of Example 19, further comprising: performing a user equipment context relocation over an Xn interface for a user equipment in a radio resource control inactive state.

Example 21. The method of any of Examples 19-20, wherein the data to be forwarded is buffered or received at the second network node.

Example 22. The method of any of Examples 19-21, wherein the data sent to the first network node based at least on the data forwarding information received from the core network entity is based at least on one or more tunnel endpoint identifiers included in the data forwarding information.

Example 23. The method of any of Examples 19-22, further comprising: receiving a context retrieve request forwarded from a third network node; and send a context retrieve response to the third network node in response to the receiving of the context retrieve request forwarded from the third network node.

Example 24. The method of any of Examples 1-23, wherein the path switch request message, path switch request acknowledge message, and/or user equipment context release command message are exchanged via next generation application protocol (NGAP) signaling.

Example 25. The method of any of Examples 1-24, wherein the first network node, second network node, and/or third network node is a first gNB/NG-RAN node, a second gNB/NG-RAN node, and/or a third gNB/NG-RAN node.

Example 26. The method of any of Examples 1-25, wherein no direct connection is available between the first network node and second network node, and wherein the third network node has direct connections to the first network node and the second network node.

Example 27. The method of any of Examples 1-26, wherein the UE is in a radio resource control inactive or idle state.

Example 28. An apparatus comprising means for performing the method of any of Examples 1-27.

Example 29. A non-transitory computer-readable storage medium comprising instructions stored thereon that, when executed by at least one processor, are configured to cause a computing system to perform the method of any of Examples 1-27.

Example 30. An apparatus comprising: at least one processor; and at least one memory including computer program code, the at least one memory and the computer program code configured to, with the at least one processor, cause the apparatus at least to perform the method of any of Examples 1-27.

Figure 8:
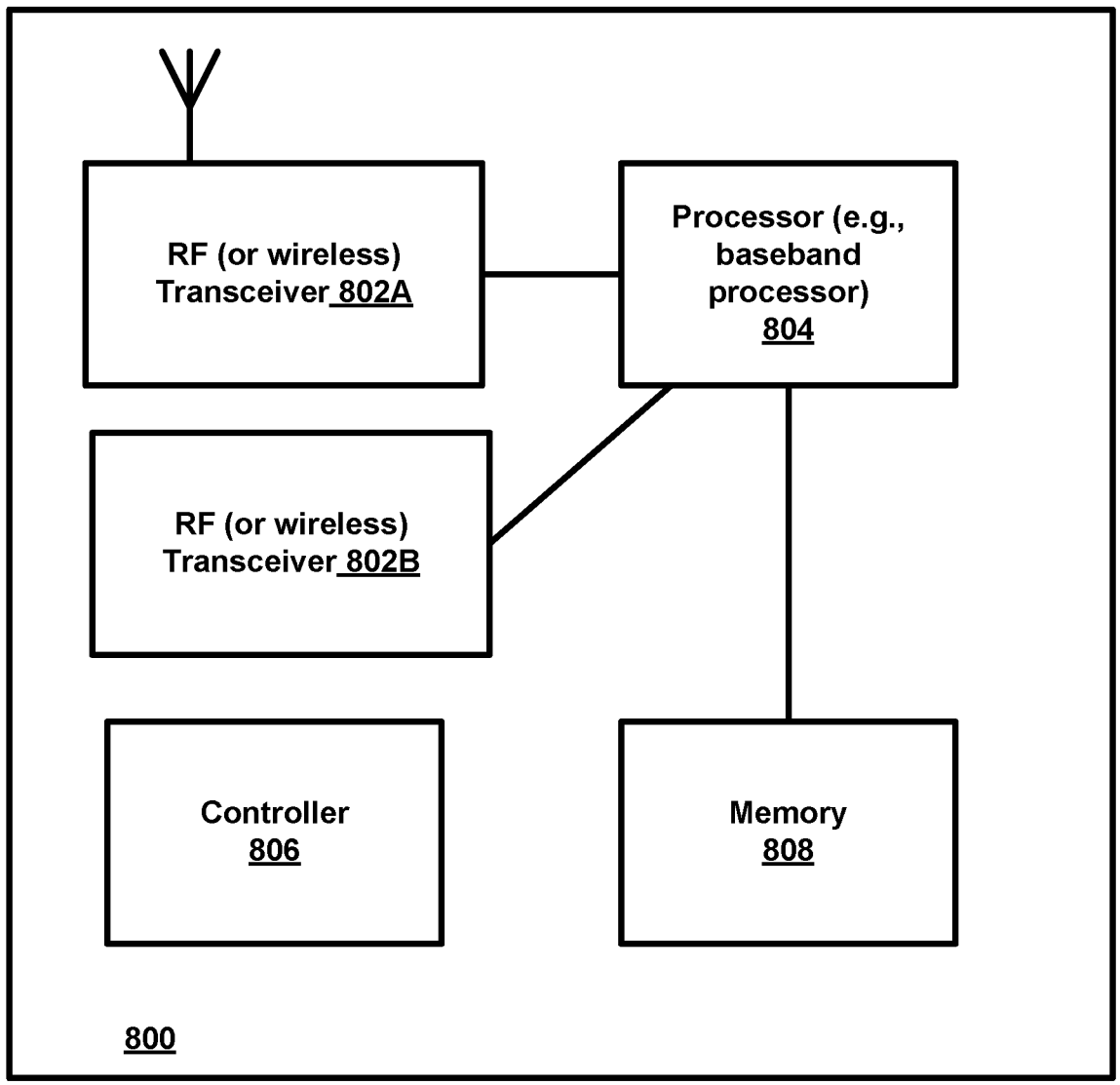
FIG. 8 is a block diagram of a node or wireless station (e.g., base station/access point or mobile station/user device/UE), according to an example implementation.

FIG. 8 is a block diagram of a wireless station (e.g., user equipment (UE)/user device or AP/gNB/MgNB/SgNB) 800 according to an example implementation. The wireless station 800 may include, for example, one or more RF (radio frequency) or wireless transceivers 802A, 802B, where each wireless transceiver includes a transmitter to transmit signals and a receiver to receive signals. The wireless station also includes a processor or control unit/entity (controller) 804/806 to execute instructions or software and control transmission and receptions of signals, and a memory 808 to store data and/or instructions.

Processor 804 may also make decisions or determinations, generate frames, packets or messages for transmission, decode received frames or messages for further processing, and other tasks or functions described herein. Processor 804, which may be a baseband processor, for example, may generate messages, packets, frames or other signals for transmission via wireless transceiver 802 (802A or 802B). Processor 804 may control transmission of signals or messages over a wireless network, and may control the reception of signals or messages, etc., via a wireless network (e.g., after being down-converted by wireless transceiver 802, for example). Processor 804 may be programmable and capable of executing software or other instructions stored in memory or on other computer media to perform the various tasks and functions described above, such as one or more of the tasks or methods described above. Processor 804 may be (or may include), for example, hardware, programmable logic, a programmable processor that executes software or firmware, and/or any combination of these. Using other terminology, processor 804 and transceiver 802 together may be considered as a wireless transmitter/receiver system, for example.

In addition, referring to FIG. 8, a controller 806 (or processor 804) may execute software and instructions, and may provide overall control for the station 800, and may provide control for other systems not shown in FIG. 8, such as controlling input/output devices (e.g., display, keypad), and/or may execute software for one or more applications that may be provided on wireless station 800, such as, for example, an email program, audio/video applications, a word processor, a Voice over IP application, or other application or software. Moreover, a storage medium may be provided that includes stored instructions, which when executed by a controller or processor may result in the processor 804, or other controller or processor, performing one or more of the functions or tasks described above.

According to another example implementation, RF or wireless transceiver(s) 802A/802B may receive signals or data and/or transmit or send signals or data. Processor 804 (and possibly transceivers 802A/802B) may control the RF or wireless transceiver 802A or 802B to receive, send, broadcast or transmit signals or data.

Figure 9:
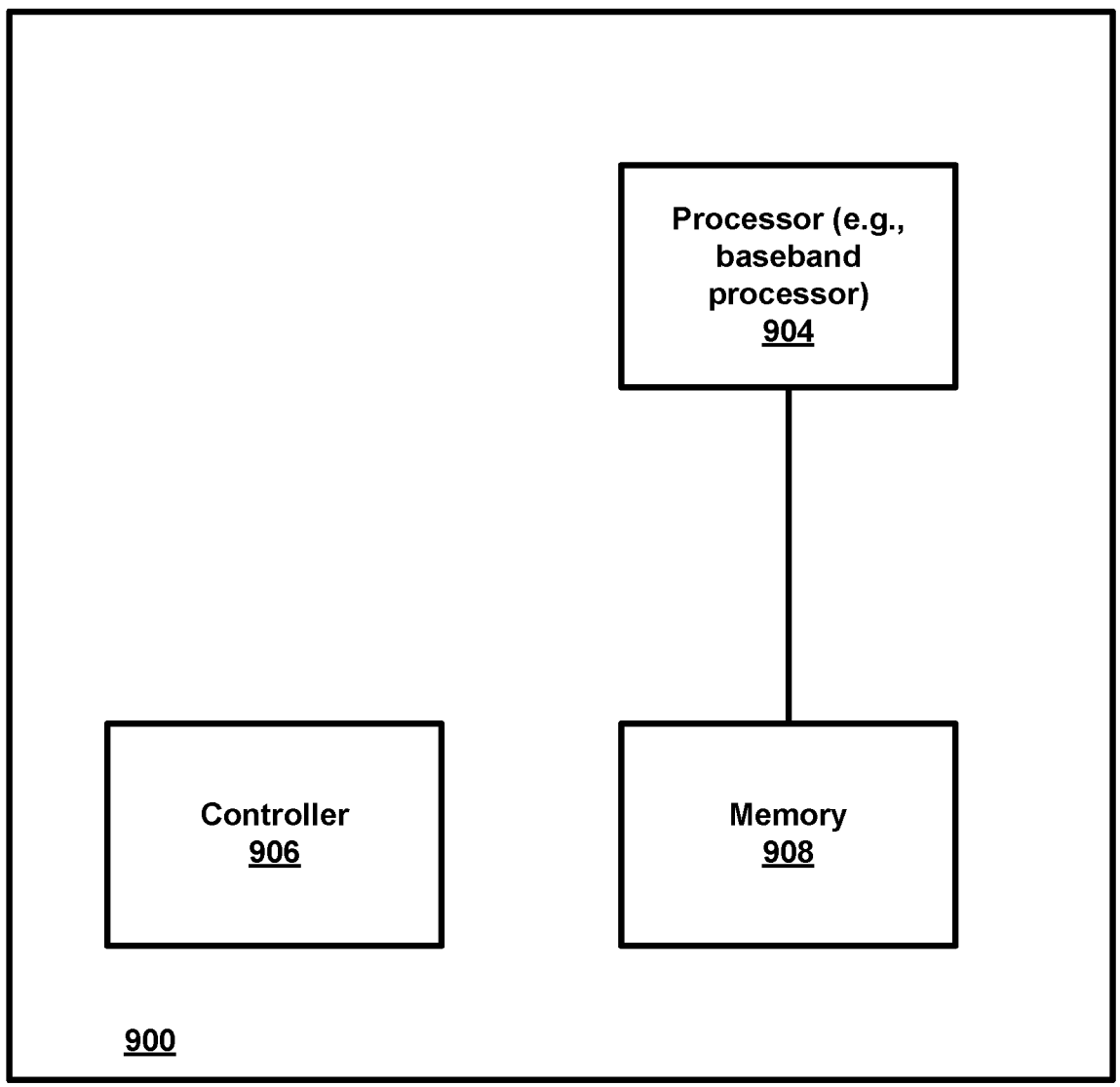
FIG. 9 is a block diagram of an AMF, according to an example implementation.

FIG. 9 is a block diagram of an AMF 900 according to an example implementation. AMF 900, which may be the same or similar to AMF 320 of FIG. 3, may include, for example, a processor or control unit/entity (controller) 904/906 to execute instructions or software and a memory 908 to store data and/or instructions.

Processor 904 may also make decisions or determinations, generate frames, packets or messages for transmission, decode received frames or messages for further processing, and other tasks or functions described herein. Processor 904, which may be a baseband processor, for example, may generate messages, packets, frames or other signals for transmission. Processor 904 may control transmission of signals or messages over a wireless or wired network, and may control the reception of signals or messages, etc., via a wireless or wired network. Processor 904 may be programmable and capable of executing software or other instructions stored in memory or on other computer media to perform the various tasks and functions described above, such as one or more of the tasks or methods described above. Processor 904 may be (or may include), for example, hardware, programmable logic, a programmable processor that executes software or firmware, and/or any combination of these.

In addition, referring to FIG. 9, a controller 906 (or processor 904) may execute software and instructions, and may provide overall control for AMF 800, and may provide control for other systems not shown in FIG. 9, such as controlling input/output devices (e.g., display, keypad), and/or may execute software for one or more applications that may be provided on AMF 900, such as, for example, an email program, audio/video applications, a word processor, a Voice over IP application, or other application or software. Moreover, a storage medium may be provided that includes stored instructions, which when executed by a controller or processor may result in the processor 904, or other controller or processor, performing one or more of the functions or tasks described above.

The aspects are not, however, restricted to the system that is given as an example, but a person skilled in the art may apply the solution to other communication systems. Another example of a suitable communications system is the 5G concept. It is assumed that network architecture in 5G will be quite similar to that of the LTE-advanced. 5G is likely to use multiple input—multiple output (MIMO) antennas, many more base stations or nodes than the LTE (a so-called small cell concept), including macro sites operating in co-operation with smaller stations and perhaps also employing a variety of radio technologies for better coverage and enhanced data rates.

It should be appreciated that future networks will most probably utilize network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or data storage may also be utilized. In radio communications this may mean node operations may be carried out, at least partly, in a server, host or node operationally coupled to a remote radio head. It is also possible that node operations will be distributed among a plurality of servers, nodes or hosts. It should also be understood that the distribution of labor between core network operations and base station operations may differ from that of the LTE or even be non-existent.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device or in a propagated signal, for execution by, or to control the operation of, a data processing apparatus, e.g., a programmable processor, a computer, or multiple computers. Implementations may also be provided on a computer readable medium or computer readable storage medium, which may be a non-transitory medium. Implementations of the various techniques may also include implementations provided via transitory signals or media, and/or programs and/or software implementations that are downloadable via the Internet or other network(s), either wired networks and/or wireless networks. In addition, implementations may be provided via machine type communications (MTC), and also via an Internet of Things (JOT).

The computer program may be in source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers.

Furthermore, implementations of the various techniques described herein may use a cyber-physical system (CPS) (a system of collaborating computational elements controlling physical entities). CPS may enable the implementation and exploitation of massive amounts of interconnected ICT devices (sensors, actuators, processors microcontrollers, . . . ) embedded in physical objects at different locations. Mobile cyber physical systems, in which the physical system in question has inherent mobility, are a subcategory of cyber-physical systems. Examples of mobile physical systems include mobile robotics and electronics transported by humans or animals. The rise in popularity of smartphones has increased interest in the area of mobile cyber-physical systems. Therefore, various implementations of techniques described herein may be provided via one or more of these technologies.

A computer program, such as the computer program(s) described above, can be written in any form of programming language, including compiled or interpreted languages, and can be deployed in any form, including as a stand-alone program or as a module, component, subroutine, or other unit or part of it suitable for use in a computing environment. A computer program can be deployed to be executed on one computer or on multiple computers at one site or distributed across multiple sites and interconnected by a communication network.

Method steps may be performed by one or more programmable processors executing a computer program or computer program portions to perform functions by operating on input data and generating output. Method steps also may be performed by, and an apparatus may be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer, chip or chipset. Generally, a processor will receive instructions and data from a read only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto optical disks, or optical disks. Information carriers suitable for embodying computer program instructions and data include all forms of non volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

What is claimed is:

1. A method, comprising:
   when operating as a first network node:
   sending a first message to a core network entity, the first message including at least a user equipment context release request and a data forwarding request; and
   receiving data of the user equipment from a second network node, wherein the data received is based at least on the data forwarding request; and when operating as a second network node:
   receiving a second message from a core network entity, the second message including at least one of a user equipment context release command and data forwarding information;
   performing context release of a user equipment; and
   sending data of the user equipment to a first network node, wherein the data sent to the first network node is based at least on the data forwarding information received from the core network entity,
   the method further comprising:
   when operating as the first network node:
   retrieving, over an Xn interface, a user equipment context stored at the second network node for the user equipment, and
   wherein the sending is performed after the retrieving, wherein the retrieving the user equipment context comprises:
   sending a user equipment context retrieve request to a third network node for forwarding to the second network node; and
   receiving a context retrieve response from the third network node in response to the sending of the context retrieve request to the third network node, wherein the context retrieve response includes the user equipment context.

2. The method of claim 1, further comprising:
   when operating as the second network node:
   performing a user equipment context relocation over an Xn interface for the user equipment in a radio resource control inactive state.

3. The method of claim 1, wherein the data sent by the second network node and received by the first network node is based at least on one or more tunnel endpoint identifiers.

4. The method of claim 1, further comprising:
   when operating as the second network node:
   receiving a context retrieve request forwarded from a third network node; and
   sending a context retrieve response to the third network node in response to the receiving of the context retrieve request forwarded from the third network node.

5. The method of claim 4, wherein no direct connection is available between the first network node and second network node, and wherein the third network node has direct connections to the first network node and the second network node.

6. The method of claim 1, further comprising:
   when operating as the first network node:
   receiving a response message from the core network entity in response to the transmitting of the first message.

7. An apparatus, comprising:
   at least one processor, and
   at least one memory including computer program code,
   wherein the at least one memory and the computer program code are configured to, with the at least one processor, cause the apparatus at least to:
   when operating as a first network node:
   send a first message to a core network entity, the first message including at least a user equipment context release request and a data forwarding request; and
   receive data of the user equipment from a second network node, wherein the data received is based at least on the data forwarding request; and
   when operating as a second network node:
   receive a second message from a core network entity, the second message including at least one of a user equipment context release command and data forwarding information; perform context release of a user equipment; and
   send data of the user equipment to a first network node, wherein the data sent to the first network node is based at least on the data forwarding information received from the core network entity,
   wherein the at least one memory and the computer program code are configured to, with the at least one processor, cause the apparatus to:
   when operating as the first network node:
   retrieve, over an Xn interface, a user equipment context stored at the second network node for the user equipment, and wherein the sending is performed after the retrieving,
wherein when retrieving the user equipment context, the at least one memory and the computer program code are configured to, with the at least one processor, cause the apparatus to:
send a user equipment context retrieve request to a third network node for forwarding to the second network node; and
receive a context retrieve response from the third network node in response to the sending of the context retrieve request to the third network node, wherein the context retrieve response includes the user equipment context.

8. The apparatus of claim 7, wherein the at least one memory and the computer program code are configured to, with the at least one processor, cause the apparatus to:
when operating as the second network node:
perform a user equipment context relocation over an Xn interface for the user equipment in a radio resource control inactive state.

9. The apparatus of claim 7, wherein the data sent by the second network node and received by the first network node is based at least on one or more tunnel endpoint identifiers.

10. The apparatus of claim 7, wherein the at least one memory and the computer program code are configured to, with the at least one processor, cause the apparatus to:
when operating as the second network node:
receive a context retrieve request forwarded from a third network node; and
send a context retrieve response to the third network node in response to the receiving of the context retrieve request forwarded from the third network node.

11. The apparatus of claim 10, wherein no direct connection is available between the first network node and second network node, and wherein the third network node has direct connections to the first network node and the second network node.

12. The apparatus of claim 7, wherein the at least one memory and the computer program code are configured to, with the at least one processor, cause the apparatus to:
when operating as the first network node:
receive a response message from the core network entity in response to the transmitting of the first message.

13. An apparatus, comprising:
at least one processor, and
at least one memory including computer program code,
wherein the at least one memory and the computer program code are configured to, with the at least one processor, cause the apparatus at least to:
when operating as a first network node:
send a first message to a core network entity, the first message including at least a user equipment context release request and a data forwarding request; and
receive data of the user equipment from a second network node, wherein the data received is based at least on the data forwarding request; and
when operating as a second network node:
receive a second message from a core network entity, the second message including at least one of a user equipment context release command and data forwarding information; perform context release of a user equipment; and
send data of the user equipment to a first network node, wherein the data sent to the first network node is based at least on the data forwarding information received from the core network entity,
wherein the at least one memory and the computer program code are configured to, with the at least one processor, cause the apparatus to:
when operating as the second network node:
receive a context retrieve request forwarded from a third network node; and
send a context retrieve response to the third network node in response to the receiving of the context retrieve request forwarded from the third network node,
wherein no direct connection is available between the first network node and second network node, and wherein the third network node has direct connections to the first network node and the second network node.

14. The apparatus of claim 13, wherein the at least one memory and the computer program code are configured to, with the at least one processor, cause the apparatus to:
when operating as the first network node:
receive a response message from the core network entity in response to the transmitting of the first message.

* * * * *